(12) United States Patent
Niu et al.

(10) Patent No.: US 12,445,987 B2
(45) Date of Patent: Oct. 14, 2025

(54) EPHEMERIS INFORMATION ACQUISITION METHOD, INDICATION METHOD, COMMUNICATION NODE AND STORAGE MEDIUM

(71) Applicant: ZTE Corporation, Guangdong (CN)

(72) Inventors: Li Niu, Guangdong (CN); Bo Dai, Guangdong (CN); Xiubin Sha, Guangdong (CN); Ting Lu, Guangdong (CN)

(73) Assignee: ZTE Corporation, Shenzhen (CN)

( * ) Notice: Subject to any disclaimer, the term of this patent is extended or adjusted under 35 U.S.C. 154(b) by 230 days.

(21) Appl. No.: 18/215,759

(22) Filed: Jun. 28, 2023

(65) Prior Publication Data
US 2023/0345396 A1    Oct. 26, 2023

Related U.S. Application Data

(63) Continuation of application No. PCT/CN2022/082527, filed on Mar. 23, 2022.

(30) Foreign Application Priority Data

Jul. 29, 2021    (CN) .......................... 202110865071.8

(51) Int. Cl.
 *H04W 56/00*    (2009.01)
 *G01S 19/08*    (2010.01)
 *H04W 84/06*    (2009.01)

(52) U.S. Cl.
 CPC ......... *H04W 56/0015* (2013.01); *G01S 19/08* (2013.01); *H04W 84/06* (2013.01)

(58) Field of Classification Search
 CPC ......... H04W 56/0015; H04W 56/0045; H04W 56/006; H04W 56/001; H04W 84/06; H04W 76/27; H04W 76/19; H04W 72/02; H04W 72/0446; H04W 72/0453; H04W 72/1273; H04W 72/231; H04W 74/0833;
 (Continued)

(56) References Cited

U.S. PATENT DOCUMENTS 10,575,229 B2    2/2020    Wu et al.
10,616,921 B2    4/2020    Tang et al.
(Continued)

FOREIGN PATENT DOCUMENTS

| CN | 101043292 A | 9/2007 |
|----|-------------|--------|
| CN | 101674128 A | 3/2010 |

(Continued)

OTHER PUBLICATIONS

Chinese office action issued in CN Patent Application No. 202410355536.9, dated Aug. 15, 2024, 14 pages. English translation included.
(Continued)

*Primary Examiner* — Ricardo H Castaneyra
(74) *Attorney, Agent, or Firm* — Perkins Coie LLP

(57) ABSTRACT

Provided are an ephemeris information acquisition method, an indication method, a communication node, and a storage medium. The ephemeris information acquisition method includes: determining that a user equipment (UE) is in an uplink out-of-synchronization state (110); and in a case of uplink out-of-synchronization, acquiring ephemeris information (120).

15 Claims, 4 Drawing Sheets

(58) Field of Classification Search
CPC ..... G01S 19/08; G01S 19/258; H04L 1/1835; H04L 1/1812; H04B 7/18513; H04B 7/1851; H04B 7/18519
USPC .............. 370/329, 331, 259, 280, 328, 336
See application file for complete search history.

(56) References Cited

U.S. PATENT DOCUMENTS

| | | | |
|---|---|---|---|
| 2010/0284376 A1* | 11/2010 | Park | H04W 56/0045 370/336 |
| 2012/0052864 A1 | 3/2012 | Swaminathan et al. | |
| 2013/0143595 A1 | 6/2013 | Moshfeghi | |
| 2016/0374072 A1* | 12/2016 | Dinan | H04W 52/146 |
| 2020/0153500 A1 | 5/2020 | Kim et al. | |
| 2020/0178135 A1 | 6/2020 | Yun et al. | |
| 2021/0273719 A1* | 9/2021 | Wang | H04B 7/18519 |
| 2022/0353794 A1* | 11/2022 | Shrestha | H04W 76/28 |
| 2022/0369264 A1* | 11/2022 | Cheng | H04W 56/0045 |

FOREIGN PATENT DOCUMENTS

| | | |
|---|---|---|
| CN | 101772150 A | 7/2010 |
| CN | 106797660 A | 5/2017 |
| CN | 110771066 A | 2/2020 |
| CN | 111770565 A | 10/2020 |

OTHER PUBLICATIONS

ETSI MCC, "Report of 3GPP TSG RAN WG2 meeting #113bis-e, Online," 3GPP TSG-RAN WG2 meeting #114-e, R2-2106641, Online, Apr. 12-20, 2021, 279 pages.

Chinese Notification to Complete Formalities of Registration issued in CN Patent Application No. 202410355536.9, dated Oct. 25, 2024, 6 pages. English translation included.

International Preliminary Report on Patentability issued in International Patent Application No. PCT/CN2022/082527, dated Jan. 18, 2024, 4 pages.

International Search Report and Written Opinion for International Application No. PCT/CN2022/082527, mailed on Jun. 10, 2022, 8 pages.

European Search Report issued in EP Patent Application No. 22847859.0, dated Nov. 25, 2024, 10 pages.

Vietnamese office action issued in VN Patent Application No. 1-2023-04320, dated on Mar. 22, 2024, 3 pages. English translation included.

European Communication pursuant to Article 94(3) EPC issued in EP Patent Application No. 22847859.0, dated Jul. 7, 2025, 6 pages.

* cited by examiner

EPHEMERIS INFORMATION ACQUISITION METHOD, INDICATION METHOD, COMMUNICATION NODE AND STORAGE MEDIUM

CROSS-REFERENCES TO RELATED APPLICATIONS

This application is a continuation of International Patent Application No. PCT/CN2022/082527, filed Mar. 23, 2022, which is based on and claims priority to Chinese Patent Application No. 202110865071.8 filed on Jul. 29, 2021, the disclosure of each of which is incorporated herein by reference in their entirety.

TECHNICAL FIELD

The present application relates to the field of wireless communication network technology, for example, an ephemeris information acquisition method, an indication method, a communication node, and a storage medium.

BACKGROUND

In a scenario of satellite communications, a base station broadcasts ephemeris information through system information so that a user equipment (UE) can obtain the location of a satellite. The UE can obtain its own location through a global navigation satellite system (GNSS), and after its own location and the location of the satellite are obtained, the UE can calculate the distance between the UE and the satellite, and based on the calculated distance, calculate the uplink synchronization information required for maintaining uplink synchronization between the UE and a serving node, that is, ephemeris information, for example, timing advance. If the UE and the serving node maintain uplink synchronization, the UE can send uplink data, and the serving node can successfully decode the uplink data. Otherwise, the UE goes through uplink out-of-synchronization and needs to stop the uplink transmission, and the serving node cannot successfully perform decoding.

Due to the movement of the satellite, the ephemeris information acquired by the UE fails, and the location of the satellite calculated by the UE as well as the distance between the UE and the satellite will also fail. If the UE cannot obtain valid ephemeris information and cannot maintain uplink synchronization, the uplink data cannot be transmitted, affecting the reliability of the communication.

SUMMARY

The present application provides an ephemeris information acquisition method, an indication method, a communication node, and a storage medium.

An embodiment of the present application provides an ephemeris information acquisition method. The method includes: it is determined that a UE is in an uplink out-of-synchronization state, and in a case where the UE is in the uplink out-of-synchronization state, ephemeris information is acquired.

An embodiment of the present application further provides an indication method. The method includes: ephemeris acquisition indication information is sent, where the indication information is used for instructing a UE to determine that the UE is in an uplink out-of-synchronization state and to acquire ephemeris information in a case where the UE is in the uplink out-of-synchronization state.

An embodiment of the present application further provides a communication node. The communication node includes a memory, a processor, and a computer program which is stored in the memory and which is capable of running on the processor, where the processor, when executing the program, implements the ephemeris information acquisition method described above or the indication method described above.

An embodiment of the present application further provides a computer-readable storage medium storing a computer program, where the program, when executed by a processor, implements the ephemeris information acquisition method described above or the indication method described above.

DETAILED DESCRIPTION

Figure 1:
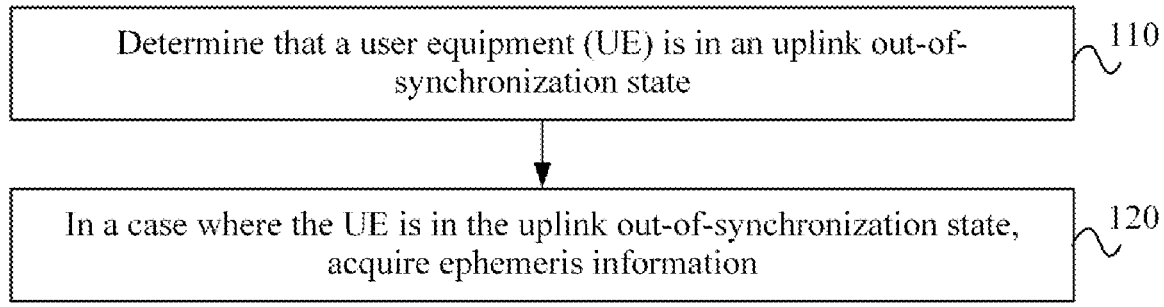
FIG. 1 is a flowchart of an ephemeris information acquisition method according to an embodiment.

The present application is described hereinafter in conjunction with drawings and embodiments. It is to be understood that the embodiments described herein are intended to explain the present application and are not intended to limit the present application. It is to be noted that if not in collision, the embodiments and features therein in the present application may be combined with each other. Additionally, it is to be noted that for ease of description, only part, not all, of structures related to the present application are illustrated in the drawings.

The embodiments of the present application provide an ephemeris information acquisition method. The method can be applied to a UE. FIG. 1 is a flowchart of an ephemeris information acquisition method according to an embodiment. As shown in FIG. 1, the method provided in this embodiment includes processes 110 and 120.

In 110, it is determined that a UE is in an uplink out-of-synchronization state.

In 120, in a case where the UE is in the uplink out-of-synchronization state, ephemeris information is acquired.

In this embodiment, in a case where the UE determines that the UE is in an uplink out-of-synchronization state due to ephemeris information failure, the UE acquires new ephemeris information. The ephemeris information is acquired to provide the basis for calculating the distance between the UE and a satellite and achieving uplink synchronization between the UE and a serving node, thereby ensuring the transmission of uplink data. The uplink out-of-synchronization state may be detected in media access control (MAC) or radio resource control (RRC) of the UE. The ephemeris information may be acquired in a MAC or an RRC.

In an embodiment, the method further includes a process 112.

In 112, in the MAC, a hybrid automatic repeat request (HARQ) buffer is cleared, a timer of uplink synchronization is stopped, and an uplink resource is released.

In this embodiment, in a case of uplink out-of-synchronization, the ephemeris information fails, and the related operations of uplink synchronization may be stopped in the MAC to save resources.

In an embodiment, the process 120 includes the following: the ephemeris information is acquired in the MAC or the RRC.

In an embodiment, the method further includes a process 122: a timer is started in the MAC or the RRC.

In this embodiment, the MAC or the RRC may start a timer, and the UE acquires the ephemeris information during the running of the timer.

In an embodiment, the starting condition of the timer includes one of the following conditions.

Uplink out-of-synchronization due to ephemeris information failure is determined in the MAC.

Uplink out-of-synchronization due to ephemeris information failure is determined in the RRC.

The MAC indicates to the RRC uplink out-of-synchronization due to ephemeris information failure.

The MAC instructs the RRC to acquire ephemeris information.

The RRC indicates to the MAC uplink out-of-synchronization due to ephemeris information failure.

The RRC instructs the MAC to acquire ephemeris information.

In an embodiment, the stopping condition of the timer includes the following condition: ephemeris information is successfully acquired in the MAC or the RRC.

In an embodiment, the method further includes a process 130: if the timer expires, the ephemeris information fails to be acquired.

In an embodiment, the process 120 includes the following: a physical downlink control channel (PDCCH) scrambled with a system information-radio network temporary identity (SI-RNTI) is monitored in the MAC, and a physical downlink shared channel (PDSCH) corresponding to the PDCCH is received, where the PDSCH carries the ephemeris information.

In an embodiment, the process 120 includes the following: a PDCCH scrambled with a cell-radio network temporary identity (C-RNTI) is monitored in the MAC, where the PDCCH scrambled with the C-RNTI carries first indication information, and the first indication information is used for indicating that a PDSCH scheduled by the PDCCH carries the ephemeris information.

In an embodiment, the process 120 includes the following: a PDSCH carrying the ephemeris information is received on a specific time-frequency resource in the MAC, where the specific time-frequency resource is determined according to at least one of a start location of a time domain, a time domain period, a time domain duration, a start location of a frequency domain, a bandwidth, or a modulation and coding scheme (MCS).

In this embodiment, the specific time-frequency resource for receiving the PDSCH and related parameters thereof may be configured or indicated by a network side.

In an embodiment, the process 120 includes the following: a PDSCH carrying the ephemeris information is received in a configured gap in the MAC, where the configured gap is determined according to at least one of a gap period, a start location of a gap, or a gap duration.

In this embodiment, the configured gap for receiving the PDSCH and related parameters thereof may be configured or indicated by the network side.

In an embodiment, the method further includes a process 140: a physical random access channel (PRACH) resource of random access is determined according to a PDCCH scrambled with a C-RNTI.

In this embodiment, the UE may initiate random access (RACH) according to a PRACH resource.

In an embodiment, the method further includes a process 150.

In 150, in a case where the ephemeris information is successfully acquired, second indication information is sent to the MAC in the RRC, where the second indication information is used for indicating that the ephemeris information is successfully acquired or indicating uplink synchronization or is used for instructing the MAC to send a random access request to a target cell.

In an embodiment, the method further includes a process 160.

In 160, in a case where the ephemeris information fails to be acquired, the RRC is enabled to enter an idle state or the RRC is instructed to initiate an RRC reestablishment procedure in the MAC.

In an embodiment, the method further includes a process 170.

In 170, in a case where the ephemeris information is successfully acquired, a random access request is sent to the MAC.

In an embodiment, the method further includes a process 180.

In 180, in a case where the ephemeris information fails to be acquired, third indication information is sent to the RRC in the MAC, where the third indication information is used for instructing the RRC to enter an idle state or is used for instructing the RRC to initiate an RRC reestablishment procedure.

In an embodiment, the method further includes a process 190.

In 190, in a case where the ephemeris information fails to be acquired, the ephemeris information is re-acquired, and an RRC reestablishment request is sent to a serving cell in the uplink out-of-synchronization state.

In an embodiment, the method further includes a process 142: a PRACH resource is randomly selected in a configured time window.

In an embodiment, the method further includes a process 144: a time window is randomly generated, and a PRACH resource is selected in the generated time window.

In an embodiment, the method further includes a process 146: a time window is generated according to a traffic type, and a PRACH resource is selected in a time window corresponding to a current traffic type.

In an embodiment, the method further includes a process 148: a start time is generated according to a traffic type, and a PRACH resource is selected according to the start time.

In an embodiment, the method further includes a process 102: configuration information is received, where the configuration information includes at least one of the following:

Indication information for enabling the UE to acquire ephemeris information in a connected state; a timer timing duration; a time-frequency resource of a physical random access channel (PRACH); a period of a PRACH; a start location of a PRACH; the number of repetitions of a PRACH; or a frequency domain location of a PRACH; or A time-frequency resource of a PDCCH; a period of a PDCCH; a start location of a PDCCH; the number of repetitions of a PDCCH; or a frequency domain location of a PDCCH; or A time-frequency resource of a measurement gap; a period of a measurement gap; a start location of a measurement gap; or a duration of a measurement gap; or A specific time-frequency resource; a time domain start location of a specific time-frequency resource; a period of a specific time-frequency resource; a duration of a specific time-frequency resource; a frequency domain start location of a specific time-frequency resource; a bandwidth of a specific time-frequency resource; or an MCS corresponding to a specific time-frequency resource; or A time window length; a minimum granularity of a time window; a value range of a time window length; a minimum granularity of a time window associated with a traffic type; a value range of a time window length associated with a traffic type; or a minimum granularity of a start time.

The embodiments of the present application further provide an indication method. The method can be applied to a network side such as a base station.

The indication method provided in this embodiment includes a process 210: ephemeris acquisition indication information is sent, where the indication information is used for instructing a UE to determine that the UE is in an uplink out-of-synchronization state and to acquire ephemeris information in a case where the UE is in the uplink out-of-synchronization state.

In this embodiment, the network side instructs the UE to acquire new ephemeris information in a case where the UE determines that the UE is in an uplink out-of-synchronization state due to ephemeris information failure to provide the basis for calculating the distance between the UE and a satellite and achieving uplink synchronization between the UE and a serving node, thereby ensuring the transmission of uplink data.

In an embodiment, the method further includes a process 220: configuration information is sent, where the configuration information includes at least one of the following:

Indication information for enabling the UE to acquire ephemeris information in a connected state; a timer timing duration; a time-frequency resource of a PRACH; a period of a PRACH; a start location of a PRACH; the number of repetitions of a PRACH; or a frequency domain location of a PRACH; or A time-frequency resource of a PDCCH; a period of a PDCCH; a start location of a PDCCH; the number of repetitions of a PDCCH; or a frequency domain location of a PDCCH; or A time-frequency resource of a measurement gap; a period of a measurement gap; a start location of a measurement gap; or a duration of a measurement gap; or A specific time-frequency resource; a time domain start location of a specific time-frequency resource; a period of a specific time-frequency resource; a duration of a specific time-frequency resource; a frequency domain start location of a specific time-frequency resource; a bandwidth of a specific time-frequency resource; or an MCS corresponding to a specific time-frequency resource; or A time window length; a minimum granularity of a time window; a value range of a time window length; a minimum granularity of a time window associated with a traffic type; a value range of a time window length associated with a traffic type; or a minimum granularity of a start time.

The process of the acquisition of ephemeris information is described below through the following examples.

Example One

In this example, the process where the MAC detects uplink out-of-synchronization and the RRC acquires ephemeris information is described.

In a scenario of satellite communications, a base station broadcasts ephemeris information through system information so that a UE can obtain the location of a satellite. The UE can obtain its own location through a GNSS. After its own location and the location of the satellite are obtained, the UE can calculate the distance between the UE and the satellite, and based on the calculated distance, calculate the ephemeris information required for maintaining uplink synchronization between the UE and the base station, for example, timing advance. If the UE and the base station maintain uplink synchronization, the UE can send uplink data, and the base station can successfully decode the uplink data. Otherwise, the UE goes through uplink out-of-synchronization and needs to stop the uplink transmission, and the base station cannot successfully perform decoding.

Due to the movement of the satellite, the ephemeris information acquired by the UE may fail, the location of the satellite calculated by the UE as well as the distance between the UE and the satellite fails, and the ephemeris information calculated by the UE also fails. If the UE is to resume the uplink data transmission, the UE needs to re-acquire ephemeris information and re-calculate the ephemeris information of the UE. However, a UE in the Internet of Things (IoT) cannot receive and transmit data at the same time, and cannot receive system information and downlink-specific data at the same time. Therefore, such a UE needs to receive ephemeris information at a specific time. The solution is as follows:

When the ephemeris information of the UE fails, the UE needs to re-acquire ephemeris information. For example, the UE starts a timer each time the ephemeris information is acquired, and if the timer expires, the corresponding ephemeris information fails. At this point, the UE re-acquires ephemeris information.

Figure 2:
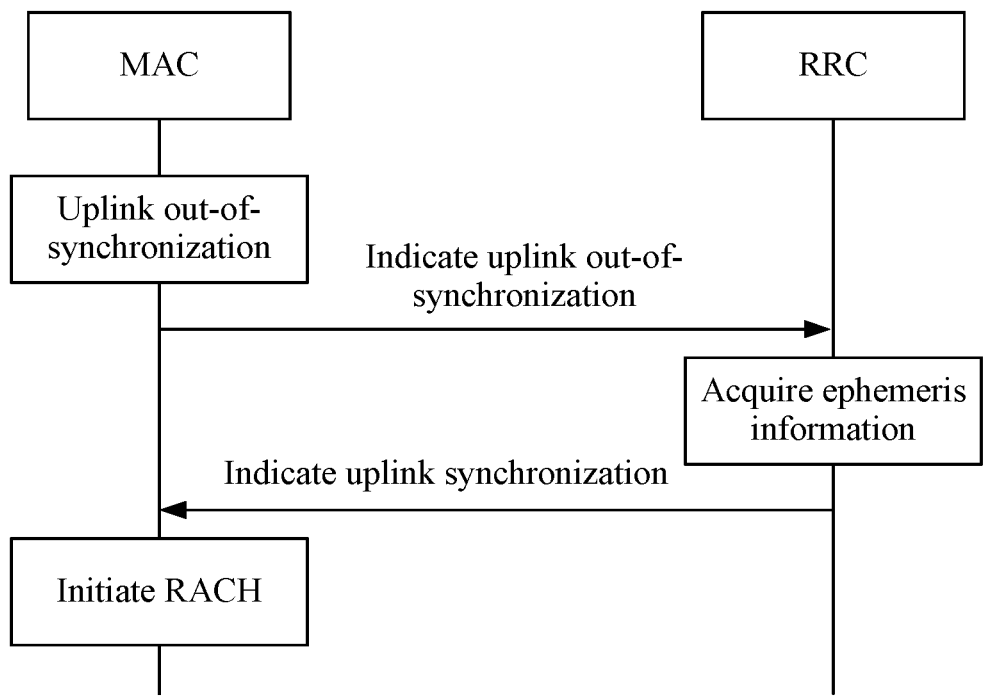
FIG. 2 is a schematic diagram of the acquisition of ephemeris information according to an embodiment.

FIG. 2 is a schematic diagram of the acquisition of ephemeris information according to an embodiment. As shown in FIG. 2, the MAC of the UE detects uplink out-of-synchronization and indicates the uplink out-of-synchronization to the RRC, and the RRC acquires ephemeris information. If the RRC successfully acquires the ephemeris information, the RRC indicates uplink synchronization to the MAC, and the MAC may initiate a RACH procedure. If the RRC fails to acquire the ephemeris information, the RRC performs the operation to return to an idle state or initiates an RRC reestablishment procedure.

The specific process is described below.

The base station broadcasts in system information or configures in an RRC message an indication bit for enabling the UE to read ephemeris information in the connected state, that is, the indication information for enabling the UE to acquire the ephemeris information in the connected state. If the base station has enabled this function, the UE re-reads ephemeris information after the ephemeris information fails.

In the process 1, when the MAC detects that the UE goes through uplink out-of-synchronization due to the ephemeris information failure, the MAC clears a HARQ buffer, stops all uplink synchronization-related timers, and releases an uplink resource such as a PUCCH and a PUSCH.

In the process 2a, the MAC indicates to the RRC that the UE goes through uplink out-of-synchronization due to the ephemeris information failure, or the MAC instructs the RRC to acquire ephemeris information. After the RRC receives the indication or the instruction from the MAC, the RRC starts a timer. During the running of the timer, the RRC acquires ephemeris information. If the RRC successfully acquires the ephemeris information during the running of the timer, the RRC stops the timer. The RRC may indicate to the MAC that the ephemeris information is successfully acquired or indicate the uplink synchronization to the MAC, or the RRC instructs the MAC to initiate a RACH. If the timer expires, the RRC performs the operation to return to the idle state or initiates an RRC reestablishment procedure.

In the process 2b, the MAC indicates to the RRC that the UE goes through uplink out-of-synchronization due to the ephemeris information failure, or the MAC instructs the RRC to acquire ephemeris information and starts a timer. The RRC receives from the MAC the indication that the UE goes through uplink out-of-synchronization due to the ephemeris information failure and acquires ephemeris information. If the RRC successfully acquires the ephemeris information during the running of the timer, the RRC indicates to the MAC that the ephemeris information is successfully acquired or indicates uplink synchronization to the MAC, or the RRC instructs the MAC to initiate a RACH. If the MAC receives the indication or the instruction from the RRC during the running of the timer, the MAC stops the timer. If the timer expires, the MAC indicates the uplink out-of-synchronization to the RRC. After the indication is received, the RRC performs the operation to return to the idle state or initiates an RRC reestablishment procedure.

In the process 2c, the MAC indicates to the RRC that the UE goes through uplink out-of-synchronization due to the ephemeris information failure or the MAC instructs the RRC to acquire ephemeris information. After the RRC receives the indication or the instruction from the MAC, the RRC acquires ephemeris information. If the RRC successfully acquires the ephemeris information, the RRC indicates to the MAC that the ephemeris information is successfully acquired or indicates uplink synchronization to the MAC, or the RRC instructs the MAC to initiate a RACH.

In the process 3, if the RRC indicates that the ephemeris information is successfully acquired or the RRC instructs the MAC to initiate the RACH and the UE maintains uplink synchronization, the MAC initiates a RACH procedure according to a configured PRACH resource.

Processes 2a, 2b, and 2c are alternatively executed. The base station may broadcast the timing duration of the timer in the system information or configure the timing duration of the timer in the RRC message. The base station broadcasts in the system information or configures in the RRC message a time-frequency resource of a PRACH, including a period, a start location, the number of repetitions, and a frequency domain location of the PRACH, where the PRACH is used for the UE to successfully read ephemeris information and then send the ephemeris information to the base station.

Example Two

In this example, the process where the MAC detects uplink out-of-synchronization and acquires ephemeris information is described.

When the ephemeris information of the UE fails, the UE needs to re-acquire ephemeris information. For example, the UE starts a timer each time the ephemeris information is acquired, and if the timer expires, the corresponding ephemeris information fails. At this point, the UE re-acquires ephemeris information.

Figure 3:
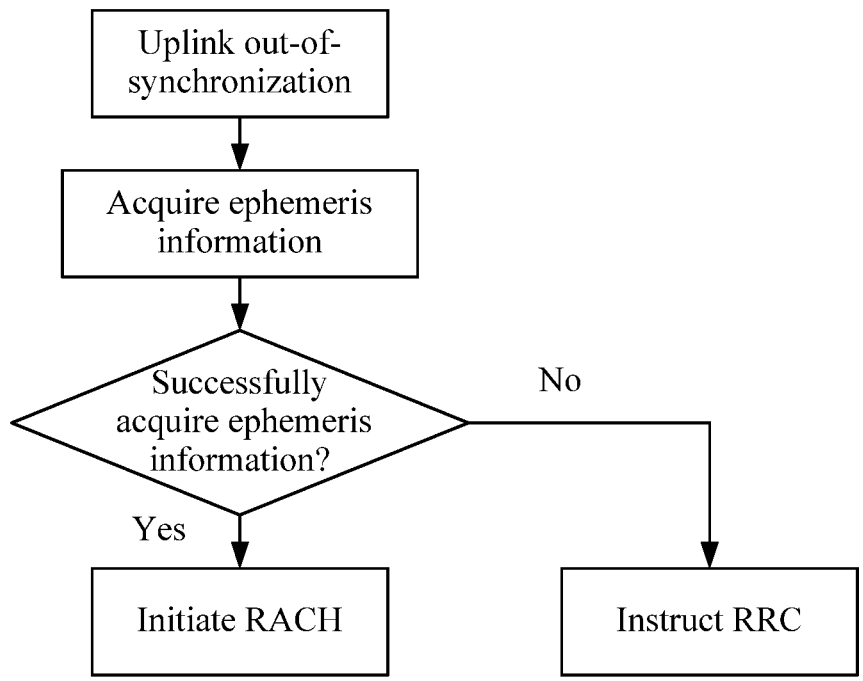
FIG. 3 is another schematic diagram of the acquisition of ephemeris information according to an embodiment.

FIG. 3 is another schematic diagram of the acquisition of ephemeris information according to an embodiment. As shown in FIG. 3, the MAC detects uplink out-of-synchronization and acquires ephemeris information. If the ephemeris information is successfully acquired, the MAC initiates a RACH procedure. If the ephemeris information fails to be acquired, the MAC instructs the RRC to perform the operation to return to the idle state or to initiate an RRC reestablishment procedure.

The specific process is described below.

The base station broadcasts in system information or configures in an RRC message an indication bit for enabling the UE to read ephemeris information in the connected state, that is, the indication information for enabling the UE to acquire the ephemeris information in the connected state. If the base station has enabled this function, the UE re-reads ephemeris information after the ephemeris information fails.

In the process 1, when the MAC detects that the UE goes through uplink out-of-synchronization due to the ephemeris information failure, the MAC clears a HARQ buffer, stops all uplink synchronization-related timers, and releases an uplink resource including a PUCCH and a PUSCH.

In the process 2a, the UE acquires ephemeris information. When the UE goes through uplink out-of-synchronization due to the ephemeris information failure, the MAC of the UE starts a timer. During the running of the timer, the MAC monitors a PDCCH scrambled with an SI-RNTI and receives a PDSCH corresponding to the PDCCH, where the PDSCH carries the ephemeris information. If the MAC successfully monitors the PDCCH scrambled with the SI-RNTI during the running of the timer, the MAC stops the timer. If the timer expires, the MAC indicates to the RRC that the ephemeris information fails to be acquired.

In the process 2b, the UE acquires ephemeris information. When the UE goes through uplink out-of-synchronization due to the ephemeris information failure, the MAC of the UE starts a timer. During the running of the timer, the MAC monitors a PDCCH scrambled with a C-RNTI. If the MAC successfully monitors the PDCCH scrambled with the C-RNTI during the running of the timer and the PDCCH carries an indication bit, indicating that the PDCCH schedules a PDSCH carrying the ephemeris information, the MAC stops the timer. If the timer expires, the MAC indicates to the RRC that the ephemeris information fails to be acquired.

In the process 2c, the UE acquires ephemeris information. When the UE goes through uplink out-of-synchronization due to the ephemeris information failure, the MAC starts a timer. The MAC receives a PDSCH on a specific time-frequency resource during the running of the timer, where the PDSCH carries the ephemeris information. If the MAC successfully receives the PDSCH on the specific time-frequency resource during the running of the timer, the UE stops the timer. The MAC indicates to the RRC that the ephemeris information is successfully acquired. If the timer expires, the MAC indicates to the RRC that the ephemeris information fails to be acquired.

In the process 2d, the UE acquires ephemeris information. When the UE goes through uplink out-of-synchronization due to the ephemeris information failure, the MAC starts a timer. The MAC receives a PDSCH in a gap configured by the base station during the running of the timer, where the PDSCH carries the ephemeris information. In such a gap, the UE does not monitor the PDCCH on an uplink search space (USS) but only detects the PDSCH. If the MAC successfully receives the PDSCH in the gap during the running of the timer, the UE stops the timer. The MAC indicates to the RRC that the ephemeris information is successfully acquired. If the timer expires, the MAC indicates to the RRC that the ephemeris information fails to be acquired.

In the process 2e, the UE also receives a PRACH resource configured by the base station. The UE monitors a PDCCH scrambled with a C-RNTI, where the PDCCH carries a specific PRACH resource and is used for the UE to initiate a RACH procedure after synchronization is acquired.

In the process 3, if the MAC indicates that the ephemeris information is successfully acquired and the UE maintains uplink synchronization, the MAC initiates a RACH procedure according to the configured PRACH resource.

Processes 2a, 2b, 2c, and 2d are alternatively executed. The base station broadcasts the duration of the timer in the system information or configures the duration of the timer in the RRC message. The base station broadcasts in the system information or configures in the RRC message a time-frequency resource of a PRACH, including a period, a start location, the number of repetitions and/or a frequency domain location of the PRACH, where the PRACH is used for the UE to successfully read ephemeris information and then send the ephemeris information to the base station.

The base station broadcasts in the system information or configures in the RRC message a time-frequency resource of a PDCCH, including a period, a start location, the number of repetitions and/or a frequency domain location of the PDCCH, where the PDCCH is used for the UE to perform monitoring when the UE reads the ephemeris information, and the PDCCH includes a machine-type communication physical downlink control channel (MPDCCH), a narrowband physical downlink control channel (NPDCCH) and/or a PDCCH.

The base station broadcasts in the system information or configures in the RRC message a time-frequency resource of a gap, including a period, a start location and/or a duration of the gap.

The base station broadcasts in the system information or configures in the RRC message or PDCCH a specific time-frequency resource, including a start location of the time domain, a time domain period, a time domain duration, a start location of the frequency domain, a bandwidth and/or an MCS.

Example Three

In this example, the process where the RRC detects uplink out-of-synchronization and acquires ephemeris information is described.

When the ephemeris information of the UE fails, the UE needs to re-acquire ephemeris information. For example, the UE starts a timer each time the ephemeris information is acquired, and if the timer expires, the corresponding ephemeris information fails. At this point, the UE re-acquires ephemeris information.

Figure 4:
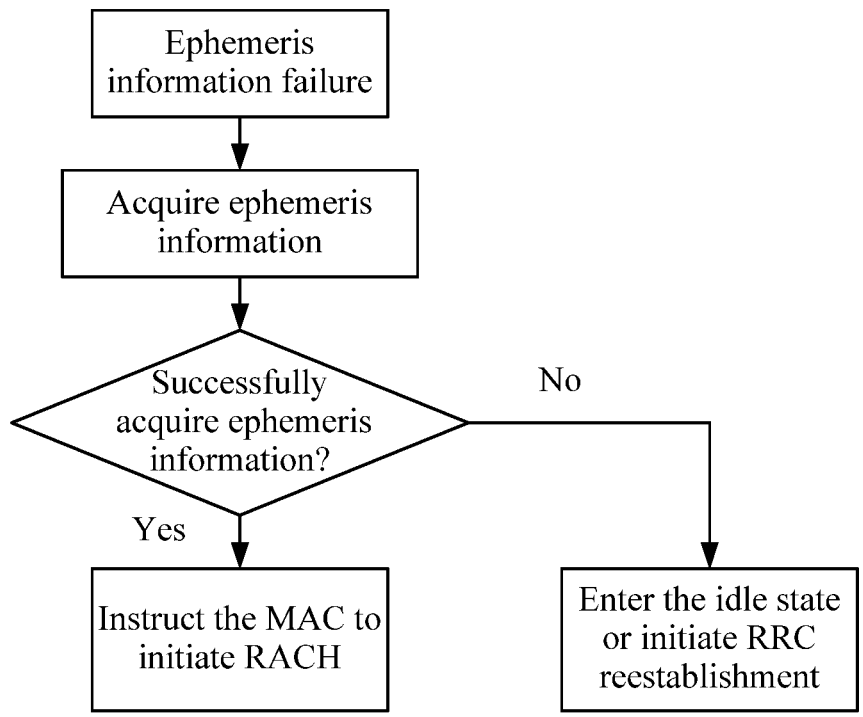
FIG. 4 is yet another schematic diagram of the acquisition of ephemeris information according to an embodiment.

FIG. 4 is yet another schematic diagram of the acquisition of ephemeris information according to an embodiment. As shown in FIG. 4, the RRC detects that ephemeris information fails, and the RRC acquires ephemeris information. If the ephemeris information is successfully acquired, the RRC instructs the MAC to initiate a RACH procedure. If the ephemeris information fails to be acquired, the RRC performs the operation to return to the idle state or initiates an RRC reestablishment procedure.

The specific process is described below.

The base station broadcasts in system information or configures in an RRC message an indication bit for enabling the UE to read ephemeris information in the connected state, that is, the indication information for enabling the UE to acquire the ephemeris information in the connected state. If the base station has enabled this function, the UE re-reads ephemeris information after the ephemeris information fails.

In the process 1, when the RRC detects that the UE goes through uplink out-of-synchronization due to the ephemeris information failure, the RRC acquires ephemeris information.

In the process 2, when the RRC acquires the ephemeris information, the RRC starts a timer. The RRC acquires the ephemeris information during the running of the timer. If the RRC successfully acquires the ephemeris information during the running of the timer, the RRC stops the timer. The RRC may indicate to the MAC that the ephemeris information is successfully acquired or indicate the uplink synchronization to the MAC. If the timer expires, the RRC performs the operation to return to the idle state or initiates an RRC reestablishment procedure.

In the process 3, if the MAC indicates that the ephemeris information is successfully acquired and the UE maintains uplink synchronization, the MAC initiates a RACH procedure according to a configured PRACH resource.

The base station broadcasts the duration of the timer in the system information or configures the duration of the timer in the RRC message. The base station broadcasts in the system information or configures in the RRC message a time-frequency resource of a PRACH, including a period, a start location, the number of repetitions and/or a frequency domain location of the PRACH, where the PRACH is used for the UE to successfully read ephemeris information and then send the ephemeris information to the base station.

The base station broadcasts in the system information or configures in the RRC message a time-frequency resource of a gap, including a period, a start location and/or a duration of the gap.

Example Four

In this example, the process where the RRC detects uplink out-of-synchronization and the MAC acquires ephemeris information is described.

When the ephemeris information of the UE fails, the UE needs to re-acquire ephemeris information. For example, the UE starts a timer each time the ephemeris information is acquired, and if the timer expires, the corresponding ephemeris information fails. At this point, the UE re-acquires ephemeris information.

Figure 5:
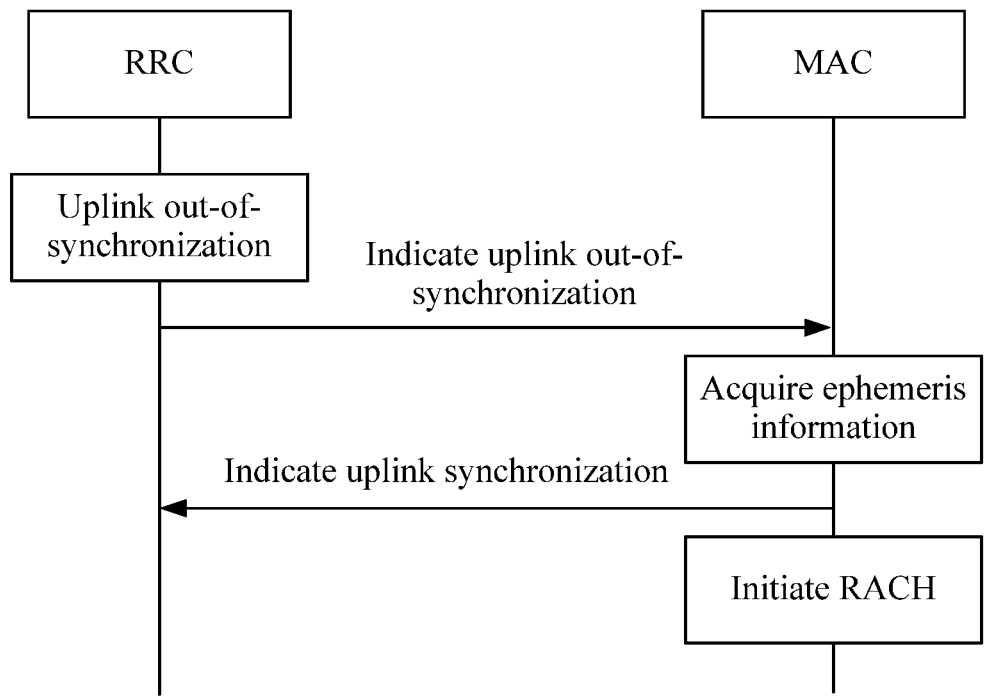
FIG. 5 is yet still another schematic diagram of the acquisition of ephemeris information according to an embodiment.

FIG. 5 is yet still another schematic diagram of the acquisition of ephemeris information according to an embodiment. As shown in FIG. 5, the RRC detects that ephemeris information fails and instructs the MAC, and the MAC acquires ephemeris information. If the ephemeris information is successfully acquired, the MAC initiates a RACH procedure and indicates to the RRC that the ephemeris information is successfully acquired. If the ephemeris information fails to be acquired, the MAC indicates to the RRC that the ephemeris information fails to be acquired, and the RRC performs the operation to return to the idle state or initiates an RRC reestablishment procedure.

The specific process is described below.

The base station broadcasts in system information or configures in an RRC message an indication bit for enabling the UE to read ephemeris information in the connected state, that is, the indication information for enabling the UE to acquire the ephemeris information in the connected state. If the base station has enabled this function, the UE re-reads ephemeris information after the ephemeris information fails.

In the process 1, when the RRC detects that the UE goes through uplink out-of-synchronization due to the ephemeris information failure, the RRC acquires ephemeris information.

In the process 2b, when the RRC acquires the ephemeris information, the RRC starts a timer and instructs the MAC to acquire the ephemeris information or indicates to the MAC that the UE goes through uplink out-of-synchronization due to the ephemeris information failure. After the MAC receives the instruction or the indication, the MAC clears a HARQ buffer, stops all uplink synchronization-related timers, and releases an uplink resource including a PUCCH and a PUSCH. The MAC starts to monitor a PDCCH scrambled with an SI-RNTI and receives a PDSCH corresponding to the PDCCH, where the PDSCH carries the ephemeris information. If the MAC successfully monitors the PDCCH scrambled with the SI-RNTI, the MAC indicates to the RRC that the ephemeris information is successfully acquired. If the RRC receives the indication that the MAC successfully acquires the ephemeris information during the running of the timer, the RRC stops the timer. If the timer expires, the RRC performs the operation to return to the idle state or initiates an RRC reestablishment procedure.

In the process 2b, when the RRC acquires the ephemeris information, the RRC starts a timer. The RRC instructs the MAC to acquire the ephemeris information or indicates to the MAC that the UE goes through uplink out-of-synchronization due to the ephemeris information failure. After the MAC receives the instruction or the indication, the MAC clears a HARQ buffer, stops all uplink synchronization-related timers, and releases an uplink resource including a PUCCH and a PUSCH. The MAC starts to monitor a PDCCH scrambled with a C-RNTI. If the MAC successfully monitors the PDCCH scrambled with the C-RNTI and the PDCCH carries an indication bit, indicating that the PDCCH schedules a PDSCH carrying the ephemeris information, the MAC indicates to the RRC that the ephemeris information is successfully acquired. If the RRC receives the indication that the MAC successfully acquires the ephemeris information during the running of the timer, the RRC stops the timer. If the timer expires, the RRC performs the operation to return to the idle state or initiates an RRC reestablishment procedure.

In the process 2c, when the RRC acquires the ephemeris information, the RRC starts a timer. The RRC instructs the MAC to acquire the ephemeris information or indicates to the MAC that the UE goes through uplink out-of-synchronization due to the ephemeris information failure. After the MAC receives the instruction or the indication, the MAC clears a HARQ buffer, stops all uplink synchronization-related timers, and releases an uplink resource including a PUCCH and a PUSCH. The MAC starts to receive a PDSCH on a specific time-frequency resource, where the PDSCH carries the ephemeris information. If the UE successfully receives the PDSCH on the specific time-frequency resource, the MAC indicates to the RRC that the ephemeris information is successfully acquired. If the RRC receives the indication that the MAC successfully acquires the ephemeris information during the running of the timer, the RRC stops the timer. If the timer expires, the RRC performs the operation to return to the idle state or initiates an RRC reestablishment procedure.

In the process 2d, when the RRC acquires the ephemeris information, the RRC starts a timer. The RRC instructs the MAC to acquire the ephemeris information or indicates to the MAC that the UE goes through uplink out-of-synchronization due to the ephemeris information failure. After the MAC receives the instruction or the indication, the MAC clears a HARQ buffer, stops all uplink synchronization-related timers, and releases an uplink resource including a PUCCH and a PUSCH. The MAC receives a PDSCH on a gap configured by the base station, where the PDSCH carries the ephemeris information. In such a gap, the UE does not monitor the PDCCH on a USS but only detects the PDSCH. If the RRC receives the indication that the MAC successfully acquires the ephemeris information during the running of the timer, the RRC stops the timer. If the timer expires, the RRC performs the operation to return to the idle state or initiates an RRC reestablishment procedure.

In the process 2e, the UE also receives a PRACH resource configured by the base station. The UE monitors a PDCCH scrambled with a C-RNTI, where the PDCCH carries a specific PRACH resource and is used for the UE to initiate a RACH procedure after synchronization is acquired.

In the process 3, if the MAC indicates that the ephemeris information is successfully acquired and the UE maintains uplink synchronization, the MAC initiates a RACH procedure according to the configured PRACH resource.

Processes 2a, 2b, 2c, and 2d are alternatively executed. The base station broadcasts the duration of the timer in the system information or configures the duration of the timer in the RRC message. The base station broadcasts in the system information or configures in the RRC message a time-frequency resource of a PRACH, including a period, a start location, the number of repetitions and/or a frequency domain location of the PRACH, where the PRACH is used for the UE to successfully read ephemeris information and then send the ephemeris information to the base station.

The base station broadcasts in the system information or configures in the RRC message or PDCCH a specific time-frequency resource, including a start location of the time domain, a time domain period, a time domain duration, a start location of the frequency domain, a bandwidth and/or an MCS.

Example Five

In this example, the process where RRC reestablishment is triggered due to ephemeris information failure is described.

In the RRC reestablishment procedure, the UE performs cell selection, selects a target cell, reads the system information of the target cell, and sends an RRC reestablishment request message. However, if the signal quality of the original cell does not deteriorate in the RRC reestablishment procedure triggered by the failure to acquire ephemeris information, the UE may still select the original cell. Moreover, the UE needs to re-acquire ephemeris information instead of other system information. In this example, the RRC reestablishment procedure is simplified.

The UE selects the original cell (that is, the cell with uplink out-of-synchronization) in the RRC reestablishment procedure triggered by the failure to acquire ephemeris information. If the system information of the original cell is valid and the system information includes, for example, a master information block (MIB) and a system information block (SIB) such as SIB1 and SIB2 and does not include the system information carrying the ephemeris information, the UE does not receive a paging message generated due to the update of system information, and at this point, the UE applies the saved information and does not re-acquire ephemeris information.

The UE re-acquires ephemeris information in the RRC reestablishment procedure triggered by the failure to acquire ephemeris information. If the ephemeris information is successfully acquired within a certain period of time, the UE sends an RRC reestablishment request message. Otherwise, the UE enters the idle state.

Example Six

In this example, the process of solving the preamble conflict is described.

When the UE needs to initiate uplink data, for example, when the UE in the idle state is called, when the UE in the idle state initiates a call, when the UE in the inactive state restores a connection or when the UE in the connected state restores a link, the location of the satellite needs to be calculated according to ephemeris information, then the time information between the UE and the satellite is estimated, for example, the uplink advance, and finally the RACH procedure is initiated. The ephemeris information is sent periodically through the system information. If multiple UEs are to initiate a RACH in the gap between two ephemeris information transmissions, these UEs all read the ephemeris information at the time of the next ephemeris information transmission and send a PRACH at the next closest PRACH time. At this point, these UEs may then go through the preamble conflict, and the PRACH congestion occurs.

The method for solving the conflict is as follows:

The base station enables the UE to avoid the PRACH congestion through the configuration of the system information or the RRC message and indicates the UE through fourth indication information. In a case where the UE is enabled, the method for solving the conflict specifically includes the following methods.

In Method one, the UE randomly selects a PRACH resource in a time window. The base station configures the length of one time window through the system information or the RRC message, and the time window is sufficiently long to contain multiple PRACH transmission resources, including frequency domains, time domains and preambles. After the UE reads the ephemeris information, the UE selects the start time of the time window as the time at which a first available PRACH resource is located according to the time window configured by the base station, where the window length of the time window is configured by the base station. The UE determines available PRACH transmission resources in the time window, randomly selects one of these PRACH transmission resources, and then sends the PRACH. Alternatively, the UE determines possible PRACH transmission resources in the time window, randomly selects one time in the time domain, then randomly selects one frequency-domain resource in the frequency domain, and finally randomly selects one preamble.

In Method two, the UE randomly generates a time window and selects a PRACH resource in the time window. The base station configures the minimum granularity of one time window through the system information or the RRC message and the value range of the window length of the time window such as a maximum window length and a minimum window length. The UE generates a random number of the window length of the time window in the value range of the window length according to the minimum granularity of the time window configured by the base station, where the window length of the time window is the product of the minimum granularity and the random number of the window length. After the UE reads the ephemeris information, the UE selects the start time of the time window as the time at which a first available PRACH resource is located, where the window length of the time window is generated by the UE. The UE determines available PRACH transmission resources in the time window, randomly selects one of these PRACH transmission resources, and then sends the PRACH. Alternatively, the UE determines possible PRACH transmission resources in the time window, randomly selects one time in the time domain, then randomly selects one frequency-domain resource in the frequency domain, and finally randomly selects one preamble.

In Method three, the UE generates time windows with different lengths according to traffic types and selects a PRACH resource in a time window. The base station configures parameters of multiple time windows through the system information or the RRC message, including a minimum granularity and a value range of the window length. Each parameter is associated with one or more traffic types. For example, the value range of the time window 1 corresponds to call initiation, the value range of the time window 2 corresponds to being called, and the value range of the time window 3 corresponds to link restoration in the connected state. After the UE reads the ephemeris information, the UE selects a parameter of a corresponding time window according to its own traffic type and generates a random number of the window length of the time window in the value range of the window length, where the window length of the time window is the product of the minimum granularity and the random number of the window length. After the UE reads the ephemeris information, the UE selects the start time of the time window as the time at which a first available PRACH resource is located, where the window length of the time window is generated by the UE. The UE determines available PRACH transmission resources in the time window, randomly selects one of these PRACH transmission resources, and then sends the PRACH. Alternatively, the UE determines possible PRACH transmission resources in the time window, randomly selects one time in the time domain, then randomly selects one frequency-domain resource in the frequency domain, and finally randomly selects one preamble.

In Method four, the UE generates a start time according to a traffic type and selects a PRACH resource. The base station configures the minimum granularity of the start time through the system information or the RRC message. The UE calculates the start time according to a traffic type. For example, the start time for the link restoration in the connected state is 0*minimum granularity, the start time for being called is 1*minimum granularity, and the start time for the initiation call is 2*minimum granularity. After the UE reads the ephemeris information, the UE selects a PRACH transmission resource after the start time according to the generated start time start, and then sends the PRACH in the PRACH transmission resource.

Figure 6:
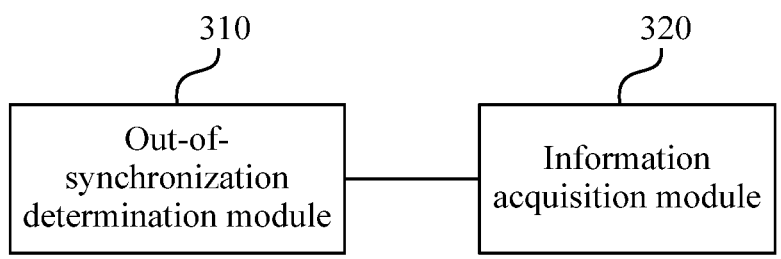
FIG. 6 is a structure diagram of an ephemeris information acquisition apparatus according to an embodiment.

The embodiments of the present application further provide an ephemeris information acquisition apparatus. FIG. 6 is a structure diagram of an ephemeris information acquisition apparatus according to an embodiment. As shown in FIG. 6, the ephemeris information acquisition apparatus includes an out-of-synchronization determination module 310 and an information acquisition module 320.

The out-of-synchronization determination module 310 is configured to determine that a UE is in an uplink out-of-synchronization state.

The information acquisition module 320 is configured to, in a case where the UE is in the uplink out-of-synchronization state, acquire ephemeris information.

In a case where the uplink out-of-synchronization state due to ephemeris information failure is determined, the ephemeris information acquisition apparatus provided in this embodiment acquires new ephemeris information. The ephemeris information is acquired to provide the basis for calculating the distance between the UE and a satellite and achieving uplink synchronization between the UE and a serving node, thereby ensuring the transmission of uplink data.

In one embodiment, the apparatus further includes a pre-operation module.

The pre-operation module is configured to clear a HARQ buffer in a MAC, stop a timer of uplink synchronization, and release an uplink resource.

In an embodiment, the information acquisition module 320 is configured to acquire the ephemeris information in the MAC or an RRC.

In an embodiment, the apparatus further includes: a timing module configured to start a timer in the MAC or the RRC.

In an embodiment, the starting condition of the timer includes one of the following conditions.

Uplink out-of-synchronization due to ephemeris information failure is determined in the MAC.

Uplink out-of-synchronization due to ephemeris information failure is determined in the RRC.

The MAC indicates to the RRC uplink out-of-synchronization due to ephemeris information failure.

The MAC instructs the RRC to acquire ephemeris information.

The RRC indicates to the MAC uplink out-of-synchronization due to ephemeris information failure.

The RRC instructs the MAC to acquire ephemeris information.

In an embodiment, the stopping condition of the timer includes the following condition: ephemeris information is successfully acquired in the MAC or the RRC.

In an embodiment, the apparatus further includes a failing module which is configured to, if the timer expires, fail to acquire the ephemeris information.

In an embodiment, the information acquisition module 320 is configured to monitor a PDCCH scrambled with an SI-RNTI in the MAC and receive a PDSCH corresponding to the PDCCH, where the PDSCH carries the ephemeris information.

In an embodiment, the information acquisition module 320 is configured to monitor a PDCCH scrambled with a C-RNTI in the MAC, where the PDCCH scrambled with the C-RNTI carries first indication information, and the first indication information is used for indicating that the PDCCH schedules a PDSCH carrying the ephemeris information.

In an embodiment, the information acquisition module 320 is configured to receive a PDSCH carrying the ephemeris information on a specific time-frequency resource in the MAC, where the specific time-frequency resource is determined according to at least one of a start location of the time domain, a time domain period, a time domain duration, a start location of the frequency domain, a bandwidth or an MCS.

In an embodiment, the information acquisition module 320 is configured to receive a PDSCH carrying the ephemeris information in a configured gap in the MAC, where the gap is determined according to at least one of a gap period, a start location of a gap, or a gap duration.

In an embodiment, the apparatus further includes a resource determination module which is configured to determine a PRACH resource of random access according to a PDCCH scrambled with a C-RNTI.

In an embodiment, the apparatus further includes a first indication module.

The first indication module is configured to, in a case where the ephemeris information is successfully acquired, send second indication information to the MAC in the RRC, where the second indication information is used for indicating that the ephemeris information is successfully acquired or indicating uplink synchronization or is used for instructing the MAC to send a random access request to a target cell.

In an embodiment, the apparatus further includes a second indication module.

The second indication module is configured to, in a case where the ephemeris information fails to be acquired, enable the RRC to enter an idle state or instruct the RRC to initiate an RRC reestablishment procedure in the MAC.

In an embodiment, the apparatus further includes an access request module.

The access request module is configured to, in a case where the ephemeris information is successfully acquired, send a random access request to the target cell in the MAC.

In an embodiment, the apparatus further includes a third indication module.

The third indication module is configured to, in a case where the ephemeris information fails to be acquired, send third indication information to the RRC in the MAC, where the third indication information is used for instructing the RRC to enter an idle state or is used for instructing the RRC to initiate an RRC reestablishment procedure.

In an embodiment, the apparatus further includes a re-acquisition module.

The re-acquisition module is configured to, in a case where the ephemeris information fails to be acquired, re-acquire the ephemeris information and send an RRC reestablishment request to a serving cell with uplink out-of-synchronization.

In an embodiment, the apparatus further includes a resource selection module which is configured to randomly select a PRACH resource in a configured time window.

In an embodiment, the apparatus further includes a resource selection module which is configured to randomly generate a time window and select a PRACH resource in the generated time window.

In an embodiment, the apparatus further includes a resource selection module which is configured to generate a time window according to a traffic type and select a PRACH resource in a time window corresponding to a current traffic type.

In an embodiment, the apparatus further includes a resource selection module which is configured to generate a start time according to a traffic type and select a PRACH resource according to the start time.

In an embodiment, the apparatus further includes a configuration receiving module which is configured to receive configuration information, where the configuration information includes at least one of the following:

Indication information for enabling the UE to acquire ephemeris information in a connected state; a timer timing duration; a time-frequency resource of a PRACH; a period of a PRACH; a start location of a PRACH; the number of repetitions of a PRACH; or a frequency domain location of a PRACH; or A time-frequency resource of a PDCCH; a period of a PDCCH; a start location of a PDCCH; the number of repetitions of a PDCCH; or a frequency domain location of a PDCCH; or A time-frequency resource of a measurement gap; a period of a measurement gap; a start location of a measurement gap; or a duration of a measurement gap; or A specific time-frequency resource; a time domain start location of a specific time-frequency resource; a period of a specific time-frequency resource; a duration of a specific time-frequency resource; a frequency domain start location of a specific time-frequency resource; a bandwidth of a specific time-frequency resource; or an MCS corresponding to a specific time-frequency resource; or A time window length; a minimum granularity of a time window; a value range of a time window length; a minimum granularity of a time window associated with a traffic type; a value range of a time window length associated with a traffic type; or a minimum granularity of a start time.

The ephemeris information acquisition apparatus provided in this embodiment and the ephemeris information acquisition method provided in the preceding embodiments belong to the same concept. For technical details not described in detail in this embodiment, reference may be made to any one of the preceding embodiments. This embodiment has the same beneficial effects as those of executing the ephemeris information acquisition method.

The embodiments of the present application further provide an indication apparatus. The apparatus includes an indication module.

The indication module is configured to send ephemeris acquisition indication information, where the indication information is used for instructing a UE to determine that the UE is in an uplink out-of-synchronization state and to acquire ephemeris information in a case of uplink out-of-synchronization.

In the ephemeris information acquisition apparatus provided in this embodiment, the UE is instructed to acquire new ephemeris information in a case where the UE determines that the UE is in an uplink out-of-synchronization state due to ephemeris information failure to provide the basis for calculating the distance between the UE and a satellite and achieving uplink synchronization between the UE and a serving node, thereby ensuring the transmission of uplink data.

In an embodiment, the apparatus further includes a configuration module.

The configuration module is configured to send configuration information, where the configuration information includes at least one of the following:

Indication information for enabling the UE to acquire ephemeris information in a connected state; a timer timing duration; a time-frequency resource of a PRACH; a period of a PRACH; a start location of a PRACH; the number of repetitions of a PRACH; or a frequency domain location of a PRACH; or A time-frequency resource of a PDCCH; a period of a PDCCH; a start location of a PDCCH; the number of repetitions of a PDCCH; or a frequency domain location of a PDCCH; or A time-frequency resource of a measurement gap; a period of a measurement gap; a start location of a measurement gap; or a duration of a measurement gap; or A specific time-frequency resource; a time domain start location of a specific time-frequency resource; a period of a specific time-frequency resource; a duration of a specific time-frequency resource; a frequency domain start location of a specific time-frequency resource; a bandwidth of a specific time-frequency resource; or an MCS corresponding to a specific time-frequency resource; or A time window length; a minimum granularity of a time window; a value range of a time window length; a minimum granularity of a time window associated with a traffic type; a value range of a time window length associated with a traffic type; or a minimum granularity of a start time.

The ephemeris information acquisition apparatus provided in this embodiment and the ephemeris information acquisition method provided in the preceding embodiments belong to the same concept. For technical details not described in detail in this embodiment, reference may be made to any one of the preceding embodiments. This embodiment has the same beneficial effects as those of executing the ephemeris information acquisition method.

Figure 7:
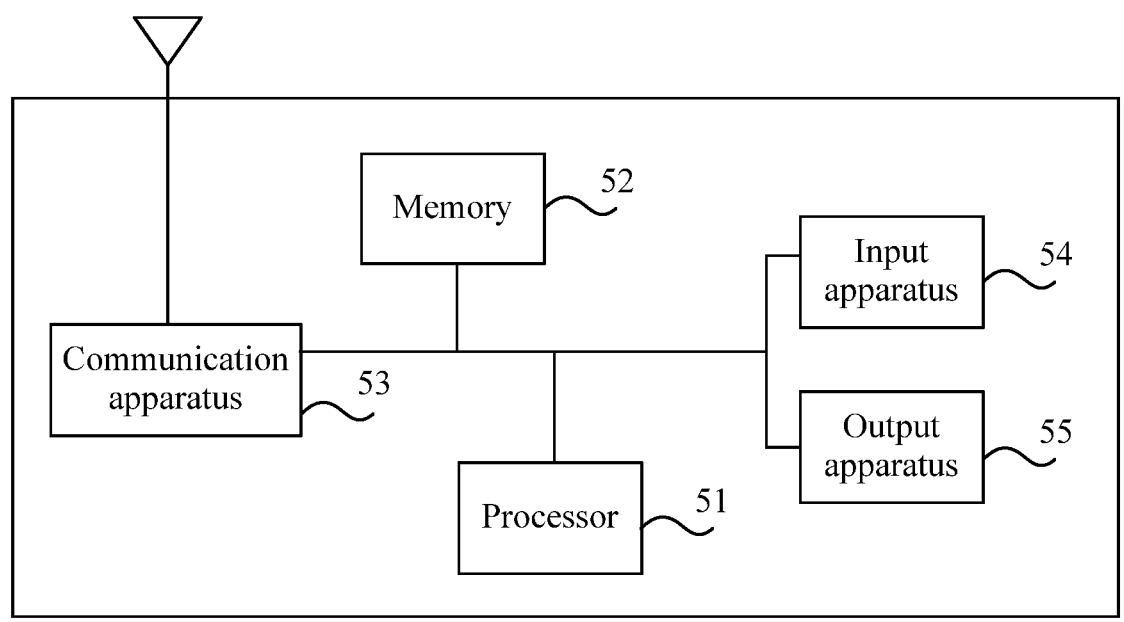
FIG. 7 is a schematic diagram of the hardware structure of a communication node according to an embodiment.

The embodiments of the present application further provide a communication node. The communication node may be a UE or a network side node. FIG. 7 is a schematic diagram of the hardware structure of a communication node according to an embodiment. As shown in FIG. 7, the communication node provided in the present application includes a memory 52, a processor 51, and a computer program which is stored in the memory and which is capable of running on the processor, where the processor 51, when executing the program, implements the ephemeris information acquisition method described above or the indication method described above.

The communication node may further include the memory 52. One or more processors 51 may be provided in the communication node, and one processor 51 is illustrated as an example in FIG. 7. The memory 52 is configured to store one or more programs, and the one or more programs, when executed by the one or more processors 51, enable the one or more processors 51 to implement the ephemeris information acquisition method or the indication method described in the embodiments of the present application.

The communication node further includes a communication apparatus 53, an input apparatus 54, and an output apparatus 55.

The processor 51, the memory 52, the communication apparatus 53, the input apparatus 54, and the output apparatus 55 in the communication node may be connected through a bus or in other manners, and the connection through the bus is illustrated as an example in FIG. 7.

The input apparatus 54 may be configured to receive input digital or character information and generate key signal input related to user settings and function control of the communication node. The output apparatus 55 may include a display device such as a display screen.

The communication apparatus 53 may include a receiver and a transmitter. The communication apparatus 53 is configured to perform information transceiving and communication under the control of the processor 51.

As a computer-readable storage medium, the memory 52 may be configured to store software programs, computer-executable programs and modules, such as program instructions/modules (for example, the out-of-synchronization determination module 310 and the information acquisition module 320 in the ephemeris information acquisition apparatus) corresponding to the ephemeris information acquisition method in the embodiments of the present application. The memory 52 may include a program storage region and a data storage region. The program storage region may store an operating system and an application program required for at least one function, and the data storage region may store data created according to the use of the communication node. In addition, the memory 52 may include a high-speed random-access memory and may also include a non-volatile memory such as at least one disk memory, a flash memory or another non-volatile solid-state memory. In some examples, the memory 52 may further include memories that are remotely disposed with respect to the processors 51, and these remote memories may be connected to the communication node through a network. Examples of the preceding network include, but are not limited to, the Internet, an intranet, a local area network, a mobile communication network, and combinations thereof.

The embodiments of the present application further provide a storage medium. The storage medium is configured to store a computer program, where the program, when executed by a processor, implements the ephemeris information acquisition method or the indication method in any one of the embodiments of the present application. The ephemeris information acquisition method includes the following: it is determined that a UE is in an uplink out-of-synchronization state, and in a case of uplink out-of-synchronization, ephemeris information is acquired. The indication method includes the following: ephemeris acquisition indication information is sent, where the indication information is used for instructing a UE to determine that the UE is in an uplink out-of-synchronization state and to acquire ephemeris information in a case of uplink out-of-synchronization.

A computer storage medium in the embodiments of the present application may adopt any combination of one or more computer-readable media. The computer-readable medium may be a computer-readable signal medium or a computer-readable storage medium. The computer-readable storage medium may be, for example, but is not limited to, an electrical, magnetic, optical, electromagnetic, infrared, or semiconductor system, apparatus, or device, or any combination thereof. Specific examples (non-exhaustive list) of the computer-readable storage medium include an electrical connection having one or more wires, a portable computer magnetic disk, a hard disk, a random-access memory (RAM), a read-only memory (ROM), an erasable programmable read-only memory (EPROM), a flash memory, an optical fiber, a portable compact disc read-only memory (CD-ROM), an optical memory device, a magnetic memory device, or any suitable combination thereof. The computer-readable storage medium may be any tangible medium that can contain, or store a program for use by or in connection with an instruction execution system, apparatus, or device.

The computer-readable signal medium may include a propagated data signal with computer-readable program codes embodied therein, for example, in a baseband or as a part of a carrier wave. Such a propagated data signal may take any of a variety of forms, including, but not limited to, electro-magnetic, optical, or any suitable combination thereof. The computer-readable signal medium may be any computer-readable medium that is not a computer-readable storage medium and that can communicate, propagate, or transport a program for use by or in connection with an instruction execution system, apparatus, or device.

The program codes included on the computer-readable medium may be transmitted through any suitable medium which includes, but is not limited to, a wire, an optical cable, a radio frequency (RF), or any suitable combination thereof.

Computer program codes for performing the operations in the present application may be written in one or more programming languages or combinations thereof. The preceding one or more programming languages include object-oriented programming languages such as Java, Smalltalk and C++, and further include conventional procedural programming languages such as C or similar programming languages. The program codes may be executed entirely on a user computer, partly on a user computer, as a stand-alone software package, partly on a user computer and partly on a remote computer, or entirely on a remote computer or a server. In the case where the remote computer is involved, the remote computer may be connected to the user computer through any type of network including a local area network (LAN) or a wide area network (WAN) or may be connected to an external computer (for example, through the Internet provided by an Internet service provider).

The preceding are merely embodiments of the present application and are not intended to limit the scope of the present application.

It is to be understood by those skilled in the art that the term "user terminal" covers any suitable type of wireless user devices, for example, a mobile phone, a portable data processing apparatus, a portable web browser, or a vehicle-mounted mobile station.

In general, the various embodiments of the present application may be implemented in hardware or special-purpose circuits, software, logic or any combination thereof. For example, some aspects may be implemented in hardware, while other aspects may be implemented in firmware or software which may be executed by a controller, a microprocessor or other computing devices, although the present application is not limited thereto.

Embodiments of the present application may be implemented through the execution of computer program instructions by a data processor of a mobile apparatus, for example, implemented in a processor entity, by hardware, or by a combination of software and hardware. The computer program instructions may be assembly instructions, instruction set architecture (ISA) instructions, machine instructions, machine-related instructions, microcodes, firmware instructions, status setting data, or source or object codes written in any combination of one or more programming languages.

A block diagram of any logic flow among the drawings of the present application may represent program processes, may represent interconnected logic circuits, modules, and functions, or may represent a combination thereof. Computer programs may be stored on the memory. The memory may be of any type suitable for a local technical environment and may be implemented using any suitable data storage technology. The memory may be, but is not limited to, a ROM, a RAM, or an optical memory device and system (for example, a digital video disc (DVD) or a compact disk (CD)). The computer-readable medium may include a non-transitory storage medium. The data processor may be of any type suitable for the local technical environment, and for example, includes, but is not limited to, a general-purpose computer, a special-purpose computer, a microprocessor, a digital signal processing (DSP), an application-specific integrated circuit (ASIC), a field-programmable gate array (FGPA), and a processor based on a multi-core processor architecture.

The detailed description of various embodiments of the present application has been provided above through various non-restrictive examples. However, considering the drawings and the claims, various modifications and adjustments to the preceding embodiments are apparent to those skilled in the art, without departing from the scope of the present application. Accordingly, the proper scope of the present application is determined according to the claims.

What is claimed is:

1. A method for wireless communication, comprising:
   receiving, by a Radio Resource Control (RRC) layer of a user equipment that operates in a satellite network, ephemeris information carried in system information that is broadcasted by a base station, the ephemeris information comprising at least satellite location information;
   starting, by the RRC layer of the user equipment, a timer upon receiving the system information;
   initiating reacquisition, by the RRC layer of the user equipment depending on an expiry of the timer, of the ephemeris information carried in the system information; and
   performing an action based at least on a success status of the reacquisition,
   wherein the action comprises informing a Medium Access Control (MAC) layer of the user equipment by the RRC layer that uplink synchronization is achieved upon successful reacquisition of the ephemeris information carried in the system information, and
   wherein the action comprises restarting, by the RRC layer of the user equipment, the timer upon an occurrence of any one of a plurality of events, the plurality of events comprising:
   (i) detecting, by the MAC layer of the user equipment, an uplink out-of-synchronization event due to a failed reception of the ephemeris information,
   (ii) detecting, by the RRC layer of the user equipment, an uplink out-of-synchronization event due to a failed reception of the ephemeris information,
   (iii) receiving, by the RRC layer of the user equipment, from the MAC layer of the user equipment, an indication of an uplink out-of-synchronization event due to a failed reception of the ephemeris information,
   (iv) receiving, by the RRC layer of the user equipment, from the MAC layer of the user equipment, an instruction to acquire the ephemeris information carried in system information,
   (v) sending, by the RRC layer of the user equipment, to the MAC layer of the user equipment, an indication of an uplink out-of-synchronization event due to a failed reception of the ephemeris information, or
   (vi) instructing, by the RRC layer of the user equipment, the MAC layer of the user equipment to acquire the ephemeris information carried in system information.

2. The method of claim 1, further comprising:
   determining, by the RRC layer of the user equipment, that the uplink synchronization is lost upon the expiry of the restarted timer.

3. The method of claim 2, comprising:
   clearing, by the MAC layer of the user equipment, a hybrid automatic repeat request (HARQ) buffer in response to the uplink synchronization being lost.

4. The method of claim 3, further comprising at least one of:
   terminating, by the MAC layer of the user equipment, all timers related to the uplink synchronization; or
   releasing, by the MAC layer of the user equipment, an uplink resource on an uplink channel, the uplink channel comprising a physical uplink control channel or a physical uplink shared channel.

5. The method of claim 1, comprising:
   enabling an uplink transmission procedure upon the MAC layer being informed that the uplink synchronization is achieved.

6. A device implemented as a user equipment configured to operate in a satellite network for wireless communication, the device implemented as a user equipment comprising a memory and one or more processors, wherein the memory stores a computer program capable of running on the processor, and the processor is configured to:
   receive ephemeris information carried in system information that is broadcasted by a base station, the ephemeris information comprising at least satellite location information;
   start a timer upon receiving the system information;
   initiate reacquisition of the ephemeris information carried in the system information depending on an expiry of the timer; and
   perform an action based at least on a success status of the reacquisition,
   wherein the action comprises informing a Medium Access Control (MAC) layer of the device that uplink synchronization is achieved upon successful reacquisition of the ephemeris information carried in the system information and
   wherein the action comprises restarting the timer upon an occurrence of any one of a plurality of events, the plurality of events comprising:
   (i) detecting, by the MAC layer of the user equipment, an uplink out-of-synchronization event due to a failed reception of the ephemeris information,
   (ii) detecting, by a Radio Resource Control (RRC) layer of the user equipment, an uplink out-of-synchronization event due to a failed reception of the ephemeris information,
   (iii) receiving, by the RRC layer of the user equipment, from the MAC layer of the user equipment, an indication of an uplink out-of-synchronization event due to a failed reception of the ephemeris information,
   (iv) receiving, by the RRC layer of the user equipment, from the MAC layer of the user equipment, an instruction to acquire the ephemeris information carried in system information,
   (v) sending, by the RRC layer of the user equipment, to the MAC layer of the user equipment, an indication of an uplink out-of-synchronization event due to a failed reception of the ephemeris information, or
   (vi) instructing, by the RRC layer of the user equipment, the MAC layer of the user equipment to acquire the ephemeris information carried in system information.

7. The device of claim 6, wherein the one or more processors that are further configured to:
   determine that the uplink synchronization is lost upon the expiry of the restarted timer.

8. The device of claim 7, wherein the one or more processors that are configured to:
   clear a hybrid automatic repeat request (HARQ) buffer in response to the uplink synchronization being lost.

9. The device of claim 8, wherein the one or more processors that are configured to:
terminate all timers related to the uplink synchronization; and/or
release an uplink resource on an uplink channel, the uplink channel comprising a physical uplink control channel or a physical uplink shared channel.

10. The device of claim 6, wherein the one or more processors that are configured to:
enable an uplink transmission procedure upon the MAC layer being informed that the uplink synchronization is achieved.

11. A non-transitory, computer-readable medium, carrying instructions that, when executed by at least one processor, performs a method comprising:
receiving ephemeris information carried in system information that is broadcasted by a base station, the ephemeris information comprising at least satellite location information;
starting a timer upon receiving the system information;
initiating reacquisition of the ephemeris information carried in the system information depending on an expiry of the timer; and
performing an action based at least on a success status of the reacquisition,
wherein the action comprises informing a Medium Access Control (MAC) layer of a user equipment that uplink synchronization is achieved upon successful reacquisition of the ephemeris information carried in the system information and
wherein the action comprises restarting the timer upon an occurrence of any one of a plurality of events, the plurality of events comprising:
(i) detecting, by the MAC layer of the user equipment, an uplink out-of-synchronization event due to a failed reception of the ephemeris information,
(ii) detecting, by a Radio Resource Control (RRC) layer of the user equipment, an uplink out-of-synchronization event due to a failed reception of the ephemeris information,
(iii) receiving, by the RRC layer of the user equipment, from the MAC layer of the user equipment, an indication of an uplink out-of-synchronization event due to a failed reception of the ephemeris information,
(iv) receiving, by the RRC layer of the user equipment, from the MAC layer of the user equipment, an instruction to acquire the ephemeris information carried in system information,
(v) sending, by the RRC layer of the user equipment, to the MAC layer of the user equipment, an indication of an uplink out-of-synchronization event due to a failed reception of the ephemeris information, or
(vi) instructing, by the RRC layer of the user equipment, the MAC layer of the user equipment to acquire the ephemeris information carried in system information.

12. The non-transitory, computer-readable medium of claim 11, wherein the method further comprises:
determining that the uplink synchronization is lost upon the expiry of the restarted timer.

13. The non-transitory, computer-readable medium of claim 12, wherein the method comprises:
clearing a hybrid automatic repeat request (HARQ) buffer in response to the uplink synchronization being lost.

14. The non-transitory, computer-readable medium of claim 13, wherein the method comprises at least one of:
terminating all timers related to the uplink synchronization; or
releasing an uplink resource on an uplink channel, the uplink channel comprising a physical uplink control channel or a physical uplink shared channel.

15. The non-transitory, computer-readable medium of claim 11, wherein the method comprises:
enabling an uplink transmission procedure upon the MAC layer being informed that the uplink synchronization is achieved.

* * * * *